(12) United States Patent
Calhoun

(10) Patent No.: US 11,085,527 B2
(45) Date of Patent: Aug. 10, 2021

(54) USING A LIMITER VALVE TO CHANGE PRESSURE IN A HYDRAULIC POWER SYSTEM

(71) Applicant: Caterpillar Paving Products Inc., Brooklyn Park, MN (US)

(72) Inventor: Jerry Calhoun, Otsego, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 34 days.

(21) Appl. No.: 16/567,634

(22) Filed: Sep. 11, 2019

(65) Prior Publication Data

US 2021/0071756 A1   Mar. 11, 2021

(51) Int. Cl.
*B60W 10/06* (2006.01)
*B60W 10/103* (2012.01)
*F16H 59/36* (2006.01)

(52) U.S. Cl.
CPC ............. *F16H 59/36* (2013.01); *B60W 10/06* (2013.01); *B60W 10/103* (2013.01); *B60W 2300/17* (2013.01); *F16H 2059/366* (2013.01)

(58) Field of Classification Search
CPC .. F16H 59/36; F16H 2059/366; B60W 10/06; B60W 10/103; B60W 20/10; B60W 30/1884; B60W 30/1856; B60W 2300/17; B60W 2510/0638; B60W 2710/09; B60W 2720/10
See application file for complete search history.

(56) References Cited

U.S. PATENT DOCUMENTS

| | | | |
|---|---|---|---|
| 4,582,141 A * | 4/1986 | van der Lely | A01B 67/00 172/3 |
| 4,805,719 A * | 2/1989 | Kostamo | B60K 17/10 180/242 |
| 5,390,759 A | 2/1995 | Gollner | |
| 6,966,180 B2 | 11/2005 | Deneir et al. | |
| 9,096,989 B2 | 8/2015 | Callaway et al. | |
| 2008/0139363 A1 * | 6/2008 | Williams | F16H 61/465 477/111 |
| 2009/0127018 A1 * | 5/2009 | Chisholm | B60W 10/06 180/307 |
| 2014/0075930 A1 * | 3/2014 | Maiyur | F16H 61/4157 60/327 |

* cited by examiner

*Primary Examiner* — Edwin A Young
(74) *Attorney, Agent, or Firm* — Harrity & Harrity LLP

(57) ABSTRACT

An electronic control module (ECM) may obtain sensor information concerning an engine and may determine, based on the sensor information, a speed of the engine. The ECM may cause a swashplate of a hydraulic pump to adjust based on the speed of the engine.

20 Claims, 3 Drawing Sheets

USING A LIMITER VALVE TO CHANGE PRESSURE IN A HYDRAULIC POWER SYSTEM

TECHNICAL FIELD

The present disclosure relates generally to controlling pressure in a hydraulic power system and, more particularly to using a limiter valve to change pressure in the hydraulic power system.

BACKGROUND

A machine, such as a compactor, may use one or more hydraulic power systems to power various vehicle systems. For example, the machine may use a hydraulic power system to provide power to propel wheels or rollers to move the machine along a base surface. As another example, the machine may use a hydraulic power system to provide power to an implement to perform various functions. In the case where the machine is a compactor, the implement may be a vibratory system operably coupled to a compacting drum of the machine to impart compacting energy to the base surface. Under certain operating conditions (e.g., when a large amount of power is provided to the wheels and/or the implement of the machine), pressure may build up in the hydraulic power system, which may cause the machine to operate in an undesired manner (e.g., stall an engine of the machine).

One attempt to reduce pressure in a hydraulic power system is disclosed in U.S. Pat. No. 9,096,989 that issued to Callaway et al. on Aug. 4, 2015 ("the '989 patent"). In particular, the '989 patent discloses a relief valve configured to release hydraulic fluid from a location between a hydraulic pump and a hydraulic motor (e.g., of a hydraulic power system) when a pressure of the hydraulic fluid exceeds a predetermined relief pressure. Accordingly, per the '989 patent, a controller may control regulated displacement of the hydraulic pump (e.g., by tilting a swashplate of the hydraulic pump to vary displacement of pistons within respective bores of the hydraulic pump) based on a total demanded flow of hydraulic fluid for the hydraulic power system rather than based solely on pressure.

While the relief valve of the '989 patent is effective to reduce pressure of a hydraulic fluid once the pressure exceeds a predetermined relief pressure, the '989 patent does not disclose evaluating other parameters associated with operation of a machine and/or an engine of the machine (e.g., a speed of an engine associated with the machine) to change or reduce pressure in a hydraulic power system. Accordingly, the system of the present disclosure solves one or more of the problems set forth above and/or other problems in the art.

SUMMARY

According to some implementations, a method may include obtaining, by an electronic control module (ECM), sensor information concerning an engine of a compactor; determining, by the ECM and based on the sensor information, a speed of the engine; and causing, by the ECM, an angle of a swashplate of a hydraulic pump of a hydraulic power system to adjust based on the speed of the engine, wherein causing the angle of the swashplate to adjust causes a propel speed of the compactor to change.

According to some implementations, a compactor may comprise an engine, a hydraulic pump with a swashplate; one or more sensors, and an electronic control module (ECM) configured to: obtain sensor information that was collected by the one or more sensors; determine, based on the sensor information, a speed of the engine; and cause, based on the speed of the engine, adjustment of the swashplate to cause a propel speed of the compactor to change.

According to some implementations, a hydraulic power system for a compactor may comprise an engine; a hydraulic pump; a swashplate associated with the hydraulic pump; one or more sensors; a servo valve; a limiter valve; and an electronic control module (ECM) configured to: receive, from the one or more sensors, sensor information concerning the engine; determine, based on the sensor information, a speed of the engine; and selectively cause, based on the speed of the engine, an angle of the swashplate to increase or decrease.

DETAILED DESCRIPTION

Figure 1:
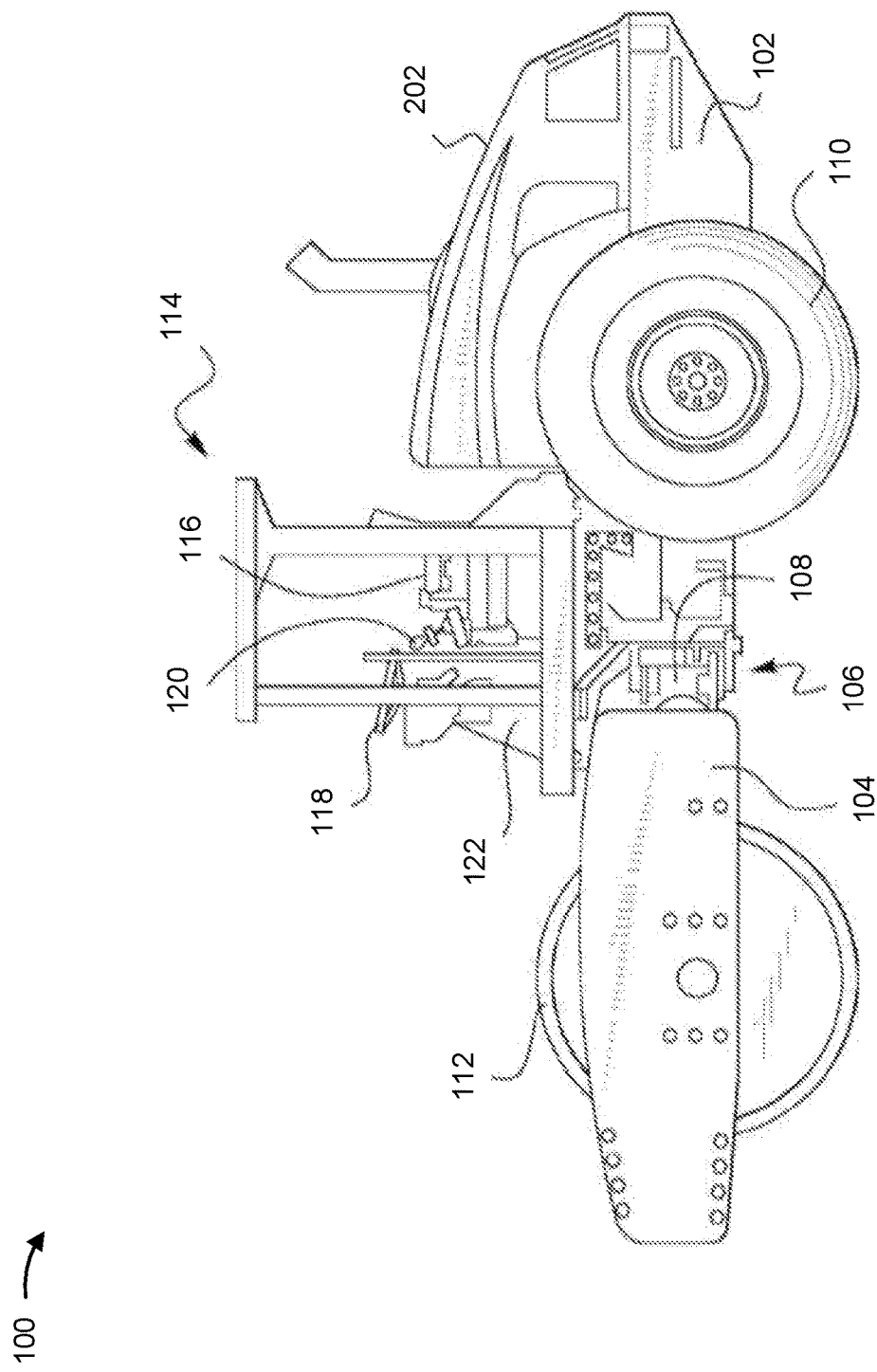
FIG. 1 is a diagram of an example machine described herein.

FIG. 1 is a diagram of an example machine 100 described herein. The term "machine" may refer to any machine that performs an operation associated with an industry such as, for example, mining, construction, farming, transportation, or any other industry. For example, the machine 100 may include a mobile machine, such as the compactor shown in FIG. 1, or any other type of mobile machine.

The Machine 100 may include an engine frame portion 102 and a non-engine frame portion 104. The engine frame portion 102 and the non-engine frame portion 104 may be connected by an articulated joint 106 that includes a hinge 108, which allows the machine 100 to steer during operation. The engine frame portion 102 may include an engine 202 and a set of wheels 110 (only one wheel is visible in FIG. 1). The engine 202 may be an internal combustion engine (for example, a compression ignition engine), but in general, the engine 202 may be any prime mover that provides power to various systems of the vehicle. The engine 202 may be fueled by such fuels as distillate diesel fuel, biodiesel, dimethyl ether, gaseous fuels (such as hydrogen, natural gas, and propane), alcohol, ethanol, and/or any combination thereof.

The non-engine frame portion 104 may accommodate an implement, such as a drum 112 that rotates about a centerline thereof while the machine 100 is in motion. The drum 112, which may include an internal vibratory system, may compact terrain beneath the machine 100. The machine 100 may be operated by an operator occupying a cab 114. The cab 114 may include a seat 116, a steering mechanism 118, one or more control inputs 120 (e.g., a speed-throttle, an implement control lever, and/or the like), a console 122, and/or other user inputs. An operator occupying the cab 114 may control various functions and motion of the machine 100 by, for example, using the steering mechanism 118 to set a direction of travel for the machine 100, or using the control input 120 to set the propel speed of the machine 100.

As indicated above, FIG. 1 is provided as an example. Other examples may differ from what is described in connection with FIG. 1.

Figure 2:
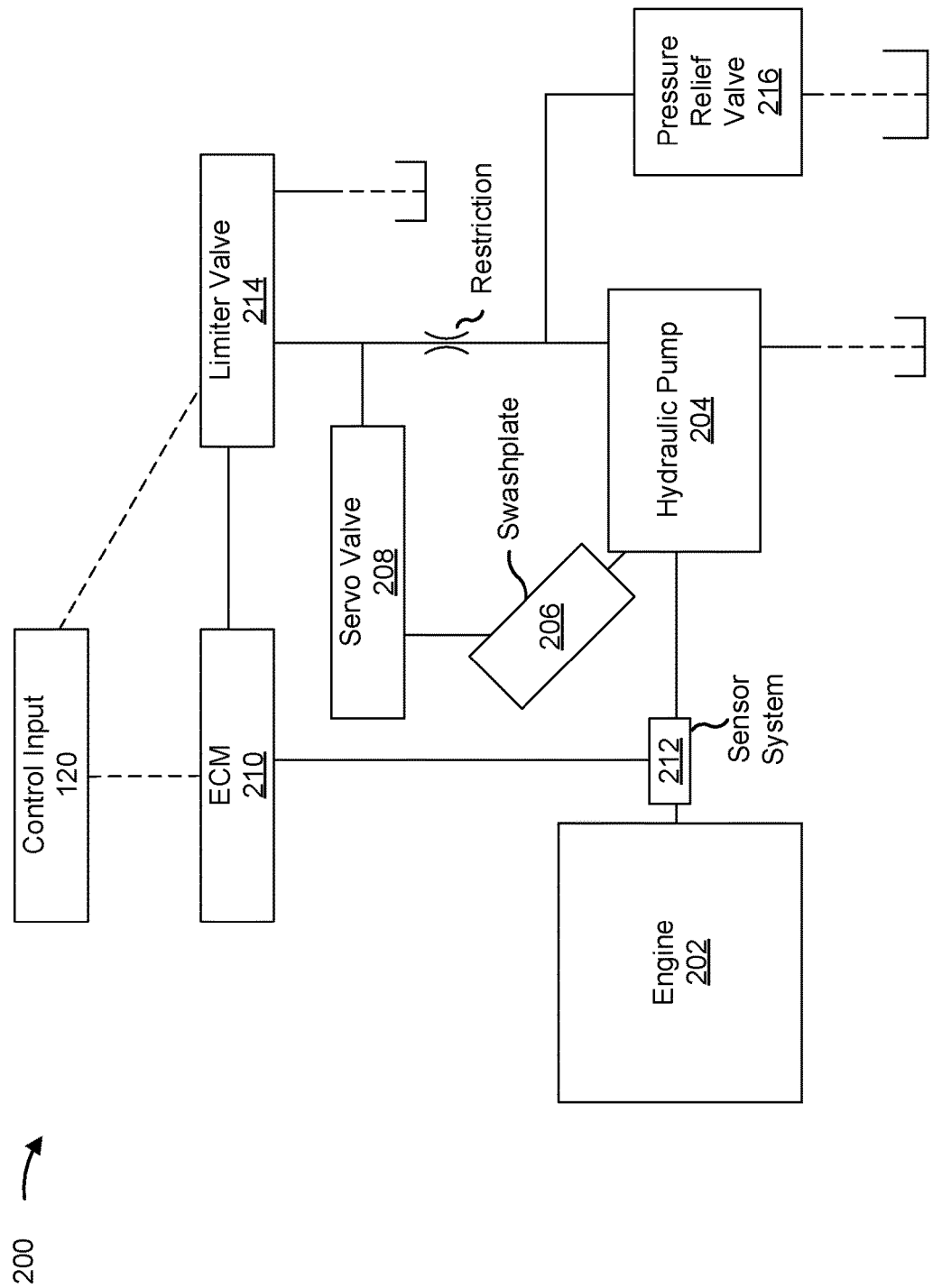
FIG. 2 is a diagram of an example hydraulic power system described herein.

FIG. 2 is a diagram of an example hydraulic power system 200 described herein. The hydraulic power system 200 may include the engine 202, which may be mechanically connected (e.g., via an output shaft of the engine 202) to a hydraulic pump 204. The hydraulic pump 204 may be a variable displacement pump. While a single hydraulic pump 204 is shown in FIG. 2, implementations may include multiple hydraulic pumps 204 (e.g., working independently, or in a coordinated manner).

The engine 202 may provide power to the hydraulic pump 204 to accommodate power demands of various systems of the machine 100. The hydraulic pump 204 may be connected via one or more fluid pressure lines to one or more hydraulic motors located on the machine 100 (not shown in FIG. 1 or 2). The hydraulic pump 204 may be configured to pressurize flow of hydraulic fluid from the hydraulic pump 204 to the one or more hydraulic motors that are configured to perform one or more functions. For example, the hydraulic pump 204 may send a pressurized flow of hydraulic fluid to a first set of hydraulic motors of machine 100 that are configured to propel the machine 100 in a particular direction and/or at a particular speed (e.g., by driving drive the set of wheels 110). As another example, the hydraulic pump 204 may send a pressurized flow of hydraulic fluid to a second set of hydraulic motors of machine 100 that are configured to power the implement (e.g., the drum 112 and/or the internal vibratory system of the drum 112) of machine 100. A pressure relief valve 216 may be connected to the one or more fluid pressure lines that connect to the hydraulic pump 204 to facilitate maintaining a consistent pressure of the hydraulic fluid flowing from the hydraulic pump 204. A speed, a torque output, a power consumption, and/or the like of the one or more hydraulic motors are proportional to the flow rate and/or pressure of the hydraulic fluid passing through the one or more hydraulic motors.

The hydraulic pump 204 may include a swashplate 206 to modify displacement of the hydraulic pump 204 (e.g., the swashplate 206 may be adjusted to different angles to adjust displacement of the hydraulic pump 204). The hydraulic pump 204 may be connected via one or more fluid pressure lines to a servo valve 208, which is connected to the swashplate 206 via one or more fluid pressure lines. The servo valve 208 may control adjustment of the swashplate 206. For example, the hydraulic pump 204 may provide a pilot flow of hydraulic fluid (e.g., a limited flow control feed of hydraulic fluid) to the servo valve 208 (e.g., as shown in FIG. 2, a restriction on the connection from the hydraulic pump 204 to the servo valve 208 may limit a flow of hydraulic fluid to the servo valve 208). The servo valve 208 may control adjustment of the swashplate 206 by allowing hydraulic fluid (e.g., the pilot flow of hydraulic fluid) to flow through the servo valve 208 to the swashplate 206. Accordingly, adjustment of the swashplate 206 may modify a displacement of the hydraulic pump 204, which may modify a flow rate and/or pressure of hydraulic fluid flowing from the hydraulic pump 204 to the one or more hydraulic motors and thereby modify the speed, the torque output, the power consumption, and/or the like of the one or more hydraulic motors.

Hydraulic power system 200 of FIG. 2 includes an electronic control module (ECM) 210. The ECM 210, as described herein, provides control of the hydraulic power system 200 and/or components of the hydraulic power system 200. The ECM 210 may be implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor may be implemented in hardware, firmware, and/or a combination of hardware and software. The ECM 210 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by the ECM 210. The ECM 210 may include a memory (e.g., a non-transitory computer-readable medium) capable of storing instructions that, when executed, cause the processor to perform one or more processes and/or methods described herein.

The ECM 210 may be electronically connected with the engine 202 and/or a sensor system 212. The sensor system 212 may provide measurements associated with various parameters used by the ECM 210 to control the hydraulic power system 200 and/or components of the hydraulic power system 200. The sensor system 212 may include physical sensors and/or any appropriate type of control system that generates values of sensing parameters based on a computational model and/or one or more measured parameters. As used herein, sensing parameters may refer to those measurement parameters that are directly measured and/or estimated by one or more sensors (e.g., physical sensors, virtual sensors, and/or the like). Example sensors may include temperature sensors (e.g., to measure a temperature of the engine 202, a temperature of oil used by the engine 202, and/or the like), speed sensors (e.g., to measure a speed of the engine 202 (e.g., in terms of revolutions per minute (RPM)), a speed of machine 100 (e.g., in terms of kilometers per hour, miles per hour, and/or the like), and/or the like), engine airflow sensors (e.g., to measure an engine airflow rate of the engine 202 in terms of cubic meters per minute, cubic feet per minute, and/or the like), load sensors, (e.g., to detect a load of the engine 202), and/or the like. Sensing parameters may also include any output parameters that may be measured indirectly by physical sensors and/or calculated based on readings of physical sensors.

The sensor system 212 may be configured to coincide with the ECM 210, may be configured as a separate control system, and/or may be configured as a part of other control systems. Further, the ECM 210 may implement the sensor system 212 by using computer software, hardware, or a combination of software and hardware.

As shown in FIG. 2, the limiter valve 214 may be connected to the hydraulic pump 204 via one or more fluid pressure lines. The limiter valve 214 may be a fixed orifice (e.g., an orifice with an open position and a closed position) or a variable orifice (e.g., an orifice with one or more positions). Additionally, or alternatively, the limiter valve 214 may be a relief valve, a pressure reducing valve, a flow valve (e.g., speed control valve), or any other similar type of hydraulic valve with one or more positions (e.g., a closed position and one or more open positions). In some implementations, the hydraulic pump 204 may provide a flow of hydraulic fluid (e.g., a pilot flow of hydraulic fluid) to the servo valve 208 and to the limiter valve 214. The flow of hydraulic fluid may flow through the servo valve 208 and the limiter valve 214 when the limiter valve 214 is in an open position. Additionally, or alternatively, the flow of hydraulic fluid may only flow through the servo valve 208 when the limiter valve 214 is in a closed position.

The ECM 210 may be electronically connected with the limiter valve 214 and may be configured to control the limiter valve 214. The ECM 210 may obtain sensor information (e.g., information concerning the engine 202 and/or the machine 100) from the sensor system 212 (e.g., directly from the sensor system 212 or via one or more other components or devices of machine 100, such as a different ECM). For example, the ECM 210 may obtain information concerning a speed of the engine 202, information concerning an engine airflow rate of the engine 202, information concerning a temperature of the engine 202, information concerning a load of the engine 202, information concerning a speed of machine 100, and/or the like.

The ECM 210 may process the sensor information to determine one or more parameters. For example, the ECM 210 may process (e.g., parse) the information concerning the speed of the engine 202 to determine the speed of the engine 202. As another example, the ECM 210 may process the information concerning the speed of machine 100 to determine the speed of machine 100. In this way, the ECM 210 may process the sensor information to determine the speed of the engine 202, the engine airflow rate of the engine 202, the temperature of the engine 202, the load of the engine 202, the speed of machine 100, and/or the like.

The ECM 210 may evaluate the one or more parameters. For example, the ECM 210 may determine whether the speed of the engine 202 satisfies (e.g., is greater than or equal to) an engine speed threshold. The engine speed threshold may be a minimum operating speed of the engine 202 (e.g., for the engine 202 to operate in an efficient and/or effective manner). In some implementations, the ECM 210 may cause the limiter valve 214 to adjust based on evaluating the one or more parameters. For example, the ECM 210 may determine that the speed of the engine 202 satisfies the engine speed threshold and may therefore cause the limiter valve 214 to adjust to a closed position. As another example, the ECM 210 may determine that the speed of the engine 202 fails to satisfy the engine speed threshold and may therefore cause the limiter valve 214 to adjust to an open position. In this way, the ECM 210 may cause the limiter valve 214 to adjust based on determining whether a parameter, of the one or more parameters, satisfies a threshold. In an additional example (e.g., when the limiter valve 214 is a variable orifice or a hydraulic valve with one or more positions), the ECM 210 may identify and/or determine the one or more positions of the limiter valve 214 and may determine that the speed of the engine corresponds to a particular position of the one or more positions (e.g., based on a lookup table). The ECM 210 may therefore cause the limiter valve 214 to adjust to the particular position.

In some implementations, an operator of the machine 100 may interact with the control input 120 to cause the limiter valve 214 to adjust. For example, the operator may want to change a propel speed of the machine 100, and may engage the control input 120 to generate an input command (e.g., a command to adjust the limiter valve). The control input 120 may send the input command to the limiter valve 214 and the limiter valve may adjust accordingly (e.g., adjust to an open position or to a closed position). Additionally, or alternatively, the control input may send the input command to the ECM 210, which may evaluate the input command with the one or more parameters (e.g., the one or more parameters determined by processing the sensor information). For example, the ECM 210 may determine that the speed of the engine 202 fails to satisfy the engine speed threshold and that the input command indicates that the limiter valve 214 is to adjust to an open position. Accordingly, the ECM may therefore cause the limiter valve 214 to adjust to the open position. In another example, the ECM 210 may determine that the speed of the engine 202 satisfies the engine speed threshold and may therefore refrain from causing the limiter valve 214 to adjust to the open position, regardless of the input command (e.g., to prevent opening the limiter valve at a high engine speed, which may cause the machine 100 to operate in an undesired manner and/or may damage the hydraulic power system 200).

To cause the limiter valve 214 to adjust, the ECM 210 and/or the control input 120 may send an electrical current to the limiter valve 214. For example, the ECM 210 and/or the control input 120 may send an electrical current to the limiter valve 214 to cause the limiter valve to adjust to an open position. Additionally, or alternatively, the ECM 210 and/or the control input 120 may send an electrical current to the limiter valve 214 to cause the limiter valve 214 to adjust to a closed position.

In some implementations, the ECM 210 causing the limiter valve 214 to adjust to an open position or a closed position may change a flow of hydraulic fluid in the hydraulic power system 200. For example, when the limiter valve 214 is in a closed position, the flow of hydraulic fluid provided by the hydraulic pump 204 flows only through the servo valve 208 (e.g., because the closed position of the limiter valve 214 prevents any flow of hydraulic fluid through the limiter valve 214). When the limiter valve 214 is in an open position, the flow of hydraulic fluid flows through the servo valve 208 and the limiter valve 214 (e.g., because the open position of the limiter valve 214 allows a flow of hydraulic fluid through the limiter valve 214). Accordingly, an amount of hydraulic fluid flowing to the servo valve 208 may change based on whether the limiter valve 214 is in an open position or a closed position.

Moreover, a pressure of hydraulic fluid flowing to servo valve 208 may change based on whether the limiter valve 214 is in an open position or a closed position. For example, the pressure of the hydraulic fluid may decrease (e.g., the pressure of hydraulic fluid flowing to servo valve 208 may be less than a pressure of hydraulic fluid flowing from the hydraulic pump 204) when the limiter valve 214 is in an open position (e.g., because the flow of hydraulic fluid is split between the servo valve 208 and the limiter valve 214). Accordingly, the pressure of the hydraulic fluid may increase (e.g., the pressure of hydraulic fluid flowing to servo valve 208 may be the same or similar as the pressure of hydraulic fluid flowing from the hydraulic pump 204 due to the restriction) when the limiter valve 214 is in a closed position (e.g., because the hydraulic fluid flows to only the servo valve 208).

The change of pressure of the hydraulic fluid flowing through servo valve 208 may cause the servo valve 208 to adjust an angle of the swashplate 206, which may modify displacement of the hydraulic pump 204. For example, when the pressure of hydraulic fluid decreases due to the limiter valve 214 being in an open position, the servo valve 208 may decrease an angle of the swashplate 206, which may reduce a displacement of the hydraulic pump 204 (e.g., destroke the hydraulic pump 204). Furthermore, a change in displacement of the hydraulic pump 204 may change a flow rate and/or pressure of hydraulic fluid flowing from the hydraulic pump 204 to the one or more hydraulic motors (e.g., to propel the machine 100, to power the implement (e.g., the drum 112 and/or the internal vibratory system of the drum 112) of the machine 100, and/or the like). Accordingly, this may cause a propel speed of the machine 100 to change (e.g., the propel speed may decrease when the displacement of the hydraulic pump is decreased, the propel speed may increase when the displacement of the hydraulic pump is increased, and/or the like), an operation speed of the implement to change (e.g., the operation speed may decrease when the displacement of the hydraulic pump is decreased, the operation speed may increase when the displacement of the hydraulic pump is increased, and/or the like), and/or the like.

While some implementations described herein are directed to controlling the limiter valve 214 to cause the servo valve 208 to adjust an angle of the swashplate 206 (e.g., by changing a pressure of the hydraulic fluid flowing through the servo valve 208), other implementations include the ECM 210 directly causing the angle of the swashplate 206 to adjust. For example, the ECM 210 may be electronically connected with the swashplate 206 and may be configured to control adjustment of the swashplate 206 (e.g., to control the angle of the swashplate 206). For example, the ECM 210 may control adjustment of the swashplate by sending an electrical current to the swashplate 206 to cause the swashplate 206 to increase or decrease the angle of the swashplate 206.

The ECM 210 may determine when to cause the angle of the swashplate 206 to adjust in a similar manner as determining when to cause the limiter valve 214 to adjust, as described herein. For example, the ECM 210 may cause the angle of the swashplate 206 to adjust based on evaluating the one or more parameters (the speed of the engine 202, the speed of the machine 100, and/or the like) determined by processing the sensor information obtained from the sensor system 212. In another example, the ECM 210 may cause the angle of the swashplate 206 to adjust based on evaluating an input command (e.g., a command to adjust the angle of the swashplate 206) generated by the control input 120 (e.g., based on an operator of the machine 100 interacting with the control input 120) with the one or more parameters. In an additional example, the ECM 210 may cause the angle of the swashplate 206 to increase when the speed of the engine 202 satisfies an engine speed threshold, may cause the angle of the swashplate 206 to decrease when the speed of the engine 202 fails to satisfy the engine speed threshold, and/or the like. In this way the ECM 210 may directly control adjustment of the swashplate 206 without having to change a flow of hydraulic fluid in the hydraulic power system 200 and/or a pressure of the hydraulic fluid.

As indicated above, FIG. 2 is provided as an example. Other examples may differ from what is described in connection with FIG. 2.

Figure 3:
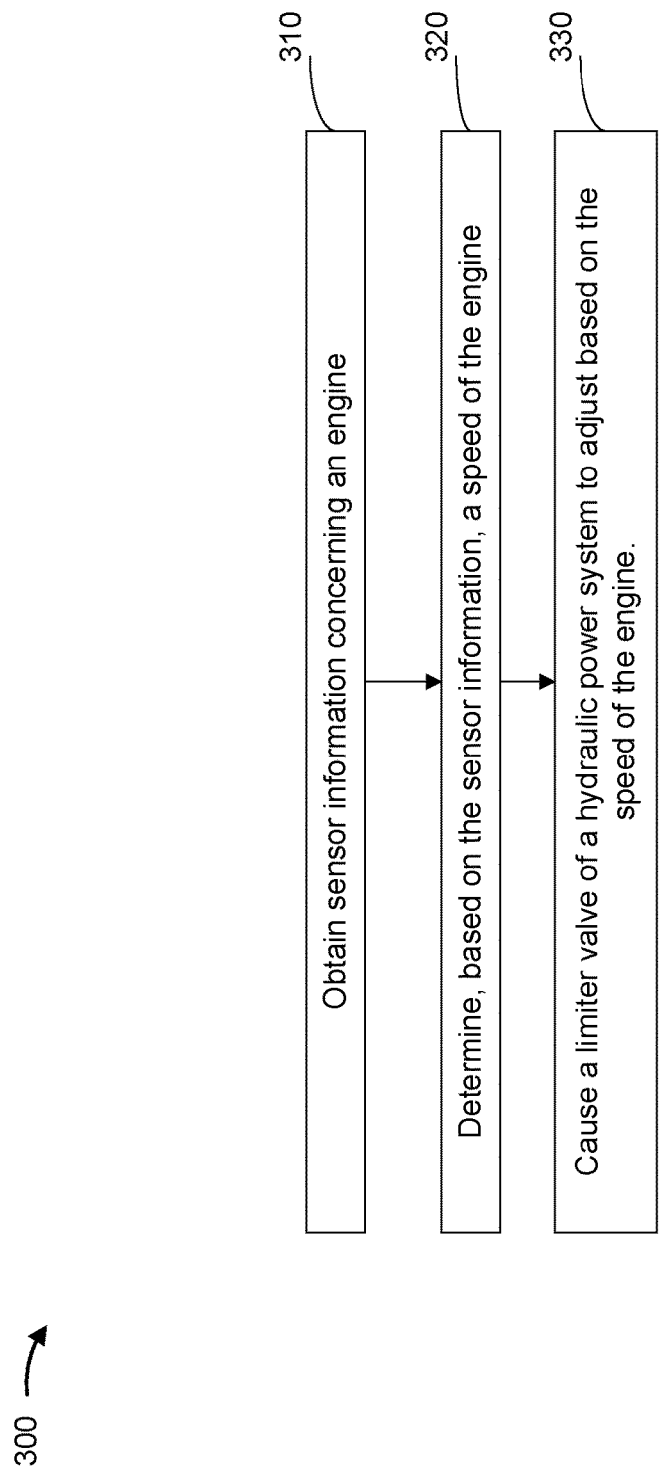
FIG. 3 is a flow chart of an example process for using a limiter valve to change pressure in a hydraulic power system.

FIG. 3 is a flow chart of an example process 300 for using a limiter valve to change pressure in a hydraulic power system. In some implementations, one or more process blocks of FIG. 3 may be performed by an ECM (e.g., ECM 210). One or more process blocks of FIG. 3 may be performed by another device or a group of devices separate from or including the ECM, such as sensor of sensor system 212, and/or the like.

As shown in FIG. 3, process 300 may include obtaining sensor information concerning an engine (block 310). For example, the ECM may obtain sensor information concerning an engine, as described above.

As further shown in FIG. 3, process 300 may include determining, based on the sensor information, a speed of the engine (block 320). For example, the ECM may determine, based on the sensor information, a speed of the engine, as described above.

As further shown in FIG. 3, process 300 may include causing a limiter valve of a hydraulic power system to adjust based on the speed of the engine (block 330). For example, the ECM may cause a limiter valve of a hydraulic power system to adjust based on the speed of the engine, as described above. In one example, the ECM may determine that the speed of the engine fails to satisfy an engine speed threshold and may cause, based on determining that the speed of the engine fails to satisfy the engine speed threshold, the limiter valve to adjust to an open position. In another example, the ECM may determine that the speed of the engine satisfies the engine speed threshold and may cause, based on determining that the speed of the engine satisfies the engine speed threshold, the limiter valve to adjust to a closed position.

Process 300 may include additional implementations, such as any single implementation or any combination of implementations described in connection with one or more other processes described elsewhere herein.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The above-described techniques allow an ECM of a hydraulic power system to control a limiter valve (e.g., cause the limiter valve to adjust to an open position or a closed position) of the hydraulic power system. In this way, the ECM may change a pressure of hydraulic fluid flowing through the hydraulic power system. This may be particularly useful when the hydraulic fluid flows to a servo valve that actuates a swashplate of a hydraulic pump of the hydraulic power system. A change of the pressure of the hydraulic fluid may cause the servo valve to adjust an angle of the swashplate, which may change a displacement of the hydraulic pump. A change in displacement of the hydraulic pump may change a flow rate and/or pressure of hydraulic fluid flowing to one or more hydraulic motors, which may affect a power output of the one or more hydraulic motors. Thus, some techniques described herein provide control of power output of the one or more hydraulic motors by controlling the limiter valve.

In this way, for example, the ECM may control the limiter valve to facilitate changing a speed of a machine (e.g., a propel speed of the machine) and/or a speed of an implement of the machine (e.g., an operation speed of the machine) without a need to adjust operation of an engine of the machine that provides mechanical power to the hydraulic pump. This may be beneficial in situations when adjusting operation of the engine (e.g., changing a speed of the engine) may cause the engine to operate in an undesired manner (e.g., cause the engine to stall).

What is claimed is:

1. A method, comprising:
   obtaining, by an electronic control module (ECM), sensor information concerning an engine of a compactor;
   determining, by the ECM and based on the sensor information, a speed of the engine; and
   causing, by the ECM, an angle of a swashplate of a hydraulic pump of a hydraulic power system to adjust based on the speed of the engine,
      wherein causing the angle of the swashplate to adjust includes:

determining whether the speed of the engine satisfies an engine speed threshold, and causing, based on whether the speed of the engine satisfies the engine speed threshold, a limiter valve of the hydraulic power system to adjust to a particular position.

2. The method of claim 1,
wherein determining whether the speed of the engine satisfies the engine speed threshold includes:
determining that the speed of the engine fails to satisfy the engine speed threshold, and
wherein the particular position is an open position.

3. The method of claim 2, wherein causing the limiter valve to adjust to the open position causes a pressure of hydraulic fluid flowing to a servo valve of the hydraulic power system to decrease.

4. The method of claim 2, wherein the limiter valve is operably connected to the hydraulic pump, and
wherein causing the limiter valve to adjust to the open position allows hydraulic fluid to flow through the limiter valve from the hydraulic pump.

5. The method of claim 1,
wherein determining whether the speed of the engine satisfies the engine speed threshold includes:
determining that the speed of the engine satisfies the engine speed threshold, and
wherein the particular position is a closed position.

6. The method of claim 1,
wherein determining whether the speed of the engine satisfies the engine speed threshold includes:
determining that the speed of the engine fails to satisfy the engine speed threshold,
wherein causing the limiter valve of the hydraulic power system to adjust to the particular position includes:
obtaining an input command to adjust the limiter valve of the hydraulic power system; and
causing, based on the input command and based on determining that the speed of the engine fails to satisfy the engine speed threshold, the limiter valve to adjust to an open position, and
wherein the particular position is the open position.

7. The method of claim 1, wherein causing the limiter valve of the hydraulic power system to adjust to the particular position includes:
sending an electrical current to the limiter valve to cause the swashplate limiter valve of the hydraulic power system to adjust to adjust to the particular position.

8. A method comprising:
determining, by an electronic control module (ECM), a speed of an engine; and
causing, by the ECM, an angle of a swashplate of a hydraulic pump of a hydraulic power system to adjust based on the speed of the engine,
wherein causing the angle of the swashplate to adjust based on the speed of the engine includes:
identifying one or more positions of a limiter valve of the hydraulic power system;
determining that the speed of the engine corresponds to a particular position of the one or more positions of the limiter valve; and
causing, based on determining that the speed of the engine corresponds to the particular position of the one or more positions of the limiter valve, the limiter valve to adjust to the particular position.

9. A compactor comprising:
an engine;
a hydraulic pump with a swashplate;
one or more sensors; and
an electronic control module (ECM) configured to:
obtain sensor information that was collected by the one or more sensors;
determine, based on the sensor information, a speed of the engine; and
cause, based on the speed of the engine, adjustment of the swashplate to cause a propel speed of the compactor to change,
wherein the ECM, when causing adjustment of the swashplate to cause the propel speed of the compactor to change, is configured to:
determine whether the speed of the engine satisfies an engine speed threshold; and
send, based on determining whether the speed of the engine satisfies the engine speed threshold, an electrical current to a limiter valve associated with the hydraulic pump to cause the limiter valve to adjust to a particular position.

10. The compactor of claim 9,
wherein the ECM, when determining whether the speed of the engine satisfies the engine speed threshold, is configured to:
determine that the speed of the engine fails to satisfy the engine speed threshold, and
wherein the particular position is an open position.

11. The compactor of claim 9, wherein sending the electrical current to the limiter valve allows hydraulic fluid to flow through the limiter valve.

12. The compactor of claim 9,
wherein the ECM, when determining whether the speed of the engine satisfies the engine speed threshold, is configured to:
determine that the speed of the engine satisfies the engine speed threshold, and
wherein the particular position is a closed position.

13. The compactor of claim 9, wherein causing adjustment of the swashplate to cause the propel speed of the compactor to change modifies a flow rate of hydraulic flowing to at least one hydraulic motor.

14. The compactor of claim 9, wherein causing adjustment of the swashplate to cause the propel speed of the compactor to change causes the hydraulic pump to destroke.

15. A hydraulic power system for a compactor comprising:
an engine;
a hydraulic pump;
a swashplate associated with the hydraulic pump;
one or more sensors;
a servo valve;
a limiter valve; and
an electronic control module (ECM) configured to:
receive, from the one or more sensors, sensor information concerning the engine;
determine, based on the sensor information, a speed of the engine; and
cause, based on the speed of the engine, an angle of the swashplate to increase or decrease,
wherein the ECM, when causing the angle of the swashplate to increase or decrease, is configured to:
determine whether the speed of the engine satisfies an engine speed threshold; and
selectively cause, based on determining whether the speed of the engine satisfies the engine speed threshold, the limiter valve to adjust to a particular position.

16. The hydraulic power system of claim 15, wherein the particular position is an open position or a closed position.

17. The hydraulic power system of claim 16, wherein selectively causing the limiter valve to adjust to the particular position allows the servo valve to adjust the angle of the swashplate associated with the hydraulic pump.

18. The hydraulic power system of claim 15, wherein causing the angle of the swashplate to increase or decrease causes a propel speed of the compactor to change.

19. The hydraulic power system of claim 15, wherein the hydraulic power system is associated with an implement of the compactor, and
   wherein causing the angle of the swashplate to increase or decrease causes an operation speed of the implement to change.

20. The hydraulic power system of claim 15, wherein the hydraulic power system further comprises a control input, and
   wherein the ECM, when selectively causing the limiter valve to adjust to the particular position, is configured to:
      obtain an input command from the control input to adjust the limiter valve;
      selectively cause, based on the input command and based on determining whether the speed of the engine satisfies the engine speed threshold, the limiter valve to adjust to the particular position.

* * * * *